(12) United States Patent
Hespeler et al.

(10) Patent No.: US 7,597,381 B2
(45) Date of Patent: Oct. 6, 2009

(54) RECREATIONAL VEHICLE MAT DEVICE

(76) Inventors: John Hespeler, 6 Wolf Ridge Gap, Ledyard, CT (US) 06339; Luanne Hespeler, 6 Wolf Ridge Gap, Ledyard, CT (US) 06339

( * ) Notice: Subject to any disclaimer, the term of this patent is extended or adjusted under 35 U.S.C. 154(b) by 22 days.

(21) Appl. No.: 12/074,074

(22) Filed: Feb. 28, 2008

(65) Prior Publication Data

US 2009/0218847 A1 Sep. 3, 2009

(51) Int. Cl.
*B60P 1/00* (2006.01)

(52) U.S. Cl. .......................................... 296/156; 5/417

(58) Field of Classification Search ................ 296/156; 5/417, 420; 224/400, 401
See application file for complete search history.

(56) References Cited

U.S. PATENT DOCUMENTS

| | | | |
|---|---|---|---|
| 1,719,055 A | 7/1929 | Herzer | |
| 2,723,156 A | 11/1955 | Stanziale | |
| 3,021,894 A | 2/1962 | La Due | |
| 3,563,594 A | 2/1971 | London | |
| 4,109,954 A | 8/1978 | Wall | |
| 4,195,875 A | 4/1980 | Venne | |
| 4,413,855 A | 11/1983 | Flanagan | |
| 4,706,991 A | 11/1987 | Miller | |
| 4,991,789 A | 2/1991 | Buerger | |
| 6,260,909 B1 | 7/2001 | Crean et al. | |
| 2006/0145514 A1 | 7/2006 | Cardwell et al. | |
| 2007/0187989 A1 | 8/2007 | Brown et al. | |

*Primary Examiner*—Lori L Lyjak
(74) *Attorney, Agent, or Firm*—Steven M. McHugh; Nicole Coppes-Gathy; Tobin, Carberry, O'Malley, Riley, Selinger

(57) ABSTRACT

A mat device for a recreational vehicle is disclosed comprising a mat configured to be utilized on a ground surface near the recreational vehicle. The mat device includes a roller unit having a rotatable bar disposed between a first end opposite a second end. The rotatable bar is coupled to a first caster device at the first end and to a second caster device at the second end. The mat is configured to couple to and roll upon the rotatable bar. The mat device includes a storage unit having a top wall opposite a bottom wall, a first side wall opposite a second side wall, and a cap opposite a back wall with a track coupled to an interior of the storage device. The track is configured to receive the first and second caster devices of the roller unit. The storage unit is located on the recreational vehicle.

20 Claims, 10 Drawing Sheets

RECREATIONAL VEHICLE MAT DEVICE

BACKGROUND

An increasingly popular mode of vacation is traveling by recreational vehicle (RV). RVs are convenient because the traveler brings their home with them on vacation. Many RVs have all the comforts of home. The majority of RV enthusiasts utilize the area surrounding their parked RV for living space as well.

Many of the campsites visited by RV enthusiasts are either dirt or gravel which can become messy. Generally, an exterior carpet, mat or tarp is utilized near the entryway of the RV to extend the living area and/or decrease the dirt tracked into the RV. The mat can be heavy and cumbersome to lift in and out of the RV. Likewise, the mat requires maintenance since it can be very dirty from continual use at RV campsites. Additionally, when rolled or folded, this dirty mat occupies a large amount of storage space either inside the RV or attached to the exterior of the RV.

What is needed in the art is an RV mat that is easy to setup, maintain, and store.

SUMMARY

The following presents a simplified summary of the present disclosure in order to provide a basic understanding of some aspects of the present disclosure. This summary is not an extensive overview of the present disclosure. It is not intended to identify key or critical elements of the present disclosure or to delineate the scope of the present disclosure. Its sole purpose is to present some concepts of the present disclosure in a simplified form as a prelude to the more detailed description that is presented herein.

The disclosure is directed a mat device for a recreational vehicle. The mat device comprises a mat configured to be utilized on a ground surface near the recreational vehicle. The mat device includes a roller unit having a rotatable bar disposed between a first end opposite a second end. The rotatable bar is coupled to a first caster device at the first end and to a second caster device at the second end. The mat is configured to couple to and to roll upon the rotatable bar. The mat device includes a storage unit having a top wall opposite a bottom wall, a first side wall opposite a second side wall, and a cap opposite a back wall with a track coupled to an interior of the storage device. The track is configured to receive the first caster device and the second caster device of the roller unit. The storage unit is located on the recreational vehicle.

A method of using a mat device for a recreational vehicle is also disclosed. The method comprises opening a cap of a storage unit, such that the storage unit comprises a top wall opposite a bottom wall, a first side wall opposite a second side wall. The cap is opposite a back wall with a track coupled to an interior of the storage device. The track is configured to receive the roller unit. The storage unit is located on the recreational vehicle. The method comprises pulling a roller unit from storage unit. The roller unit has a rotatable bar disposed between a first end opposite a second end. The rotatable bar is coupled to a first caster device at the first end and to a second caster device at the second end. A mat is coupled to and rolled upon the rotatable bar. The roller unit can move along the track and fully extend from the storage unit. The method comprises coupling at least one support to the first end of the roller unit, such that the support stands on a ground surface. The method includes removing at least one strap coupled to itself from the mat rolled upon the roller unit. The method comprises grasping a handle coupled to a first end of the mat and pulling the handle to unravel the mat from the roller unit. The method includes uncoupling receiving mechanisms of the weighted bar disposed on a first end of the mat from hooking mechanisms disposed on the rotatable bar and positioning the mat on the ground surface.

Another method of using a mat device for a recreational vehicle is also disclosed. The method comprises extending a roller unit from a storage unit disposed on a recreational vehicle. The roller unit has a rotatable bar disposed between a first end opposite a second end. The rotatable bar is coupled to a first caster device at the first end and to a second caster device at the second end. A mat is coupled to and rolled upon the rotatable bar. The roller unit moves along a track disposed in an interior of the storage unit. The method includes coupling at least one support to the first end of the roller unit, such that the support stands on a ground surface. The method comprises coupling receivers disposed on a weighted bar coupled to a second end of the mat to hooking mechanisms disposed on the rotatable bar. The method includes rotating the rotatable bar of the roller unit and rolling the mat upon the rotatable bar of the roller unit. The method comprises coupling at least one strap around the mat rolled upon the roller unit to itself, removing the support from the roller unit, and pushing the roller unit into the storage unit, such that the roller unit slides along the track and into the storage unit.

BRIEF DESCRIPTION OF THE FIGURES

Referring now to the figures, wherein like elements are numbered alike.

DETAILED DESCRIPTION

Persons of ordinary skill in the art will realize that the following disclosure is illustrative only and not in any way limiting. Other embodiments of the disclosure will readily suggest themselves to such skilled persons having the benefit of this disclosure.

The present disclosure is a portable mat for a recreational vehicle (RV). The mat can be positioned near the RV to provide additional living space. The mat can be stored in a storage unit located on the RV, for example, in an external mount fixed to the bumper (or frame) or in a rear storage compartment of the RV. The mat can be coupled to a roller unit that telescopes from the RV. Once extended and supported, the mat can be unrolled from the roller and released to the ground. The roller can then be retracted into the RV for storage. The mat is physically coupled to the roller unit. When finished using the mat, the user can reattach the mat to the roller unit and roll the mat over the roller unit. The telescoping roller unit can then be retracted back into the storage unit of the RV. The present disclosure provides a device that allows an RV mat to be easily accessible and easily maintained by the RV user.

Figure 1:
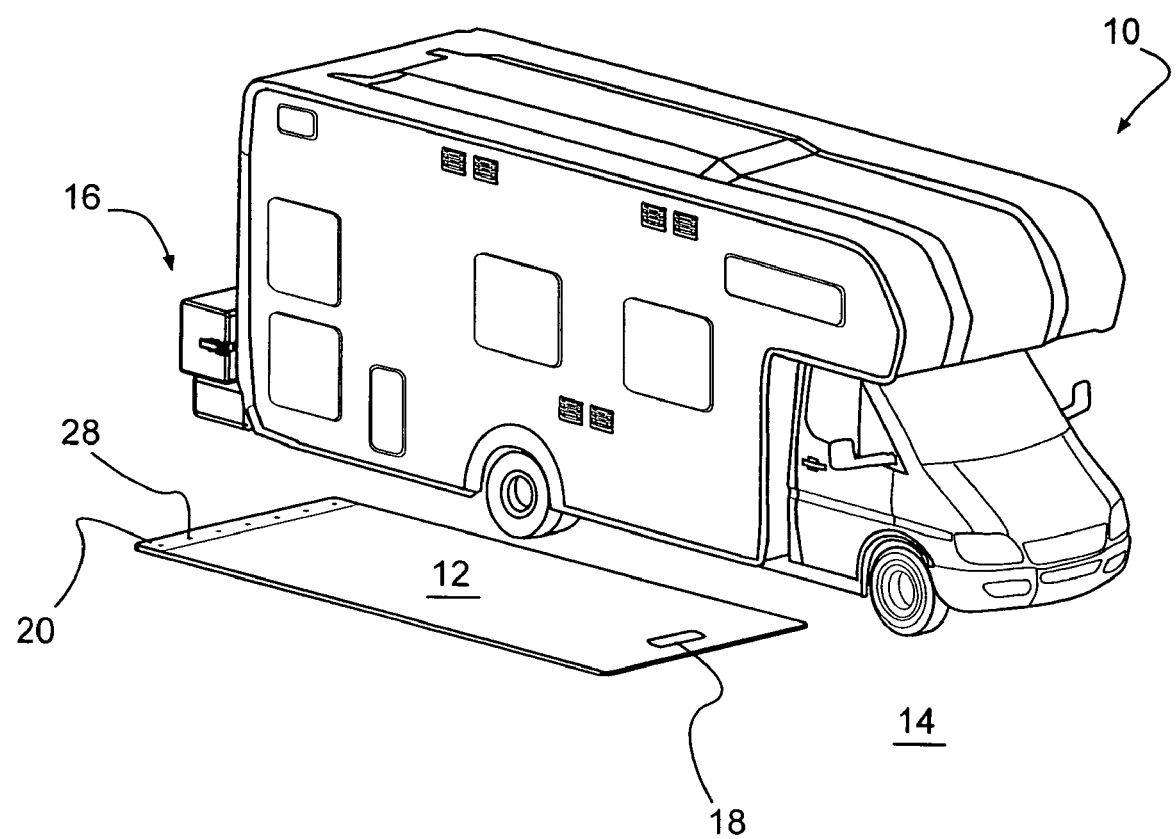
FIG. 1 is a perspective view of a recreational vehicle and an exemplary embodiment of the recreational vehicle mat device.

FIG. 1 illustrates a perspective view of a conventional RV 10 having a mat 12 disposed on the ground 14 near the RV 10. The mat 12 has been unrolled from the storage unit 16 and positioned on the ground 14. The mat 12 comprises at least one handle 18 and a weighted bar 20.

Figure 2:
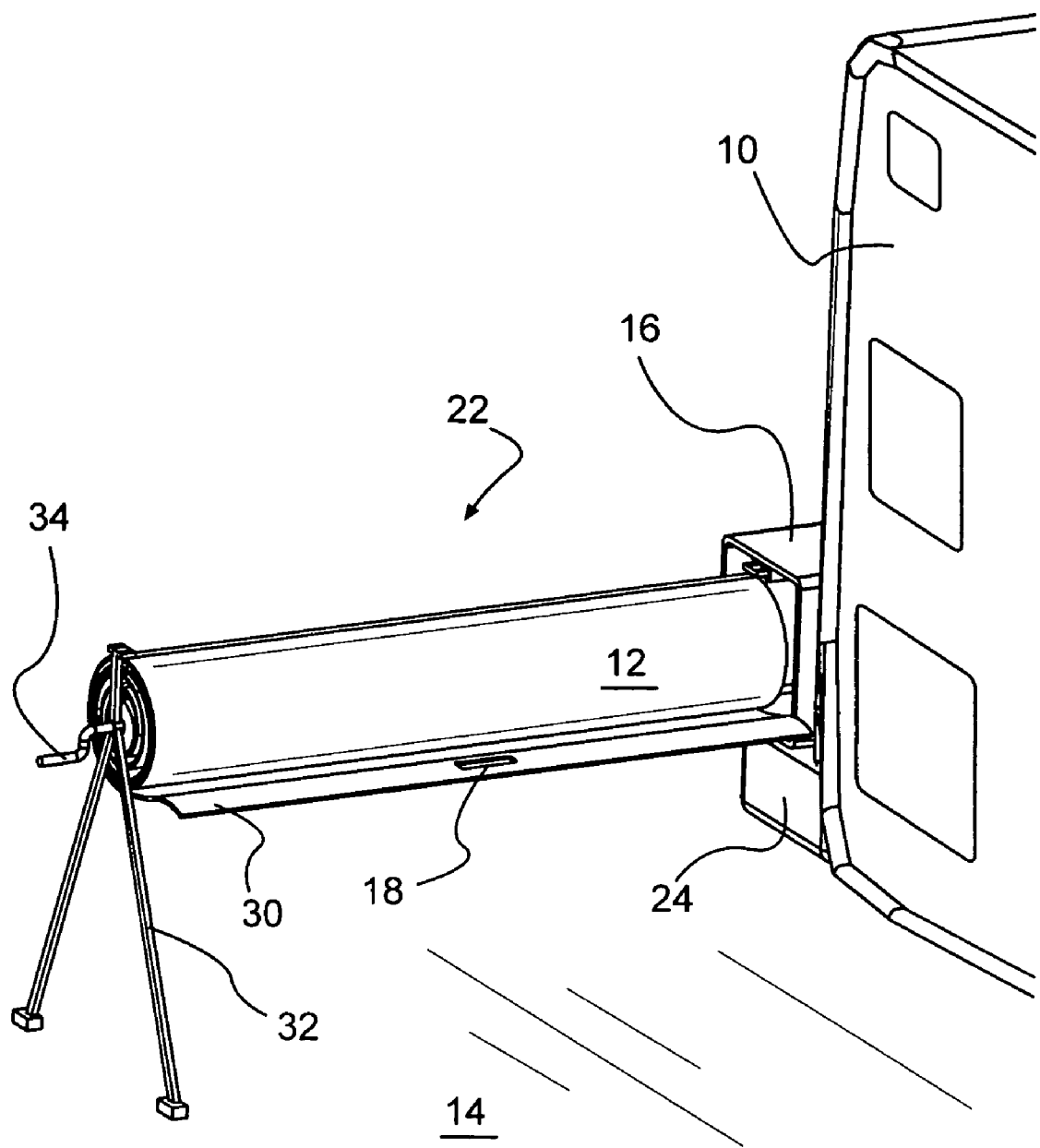
FIG. 2 is a side view of an exemplary embodiment of the recreational vehicle mat device extending from the recreational vehicle.

Referring now to FIG. 2, the roller unit 22 extending from the storage unit 16 is illustrated. The storage unit 16 is coupled to the bumper 24 of the RV 10. The mat 12 can be unrolled from the storage unit 16 utilizing the handle 18 to pull the mat 12 from the roller unit 22. A weighted bar 20 is coupled to one end of the mat 12 for ease in coupling the mat 12 to the roller unit 22. The weighted bar 20 has connection points 26 that correspond to hooking mechanisms 28 on the roller unit 22 (illustrated in FIG. 6) for coupling the mat 12 to the roller unit 22. The weighted bar 20 can be easily coupled to any type of mat 12 desired by the user. The weighted bar 20 also serves to keep the mat 12 firmly positioned on the ground 14. The handle 18 can be disposed in the material of the mat 12 or it can be coupled to another weighted bar 30 for ease in attaching the handle 18 to any desired mat material.

FIG. 2 illustrates the mat 12 rolled upon the roller unit 22. Supports 32 are utilized to support the weight of the mat 12 and roller unit 22 when extended from the storage unit 16. The supports 32 will be discussed further herein. A crank handle 34 can be utilized to roll and unroll the mat 12 from the roller unit 22. The crank handle 34 will be discussed further herein.

Typically, users of RVs 10 utilize a mat 12 that comprises a carpet material, rubber material, vinyl material, mesh material, turf material, heavy cloth material and the like. In some embodiments, the mat 12 can be personalized with words, team or sport logos, patterns, designs, and the like. It is also contemplated that written greetings can be disposed on the mat 12.

The mat 12 can be any desired length that can fit into the interior of the storage unit 16 when completely rolled up. It is contemplated that the width of the mat 12 is smaller than the width of a typical RV (i.e., about 7 to about 8 feet). The width of the mat 12 must also fit into the interior of the storage unit 16. A preferred maximum dimension of the mat 12 is about 10 feet to about 25 feet in length by about 7 feet in width.

Figure 3:
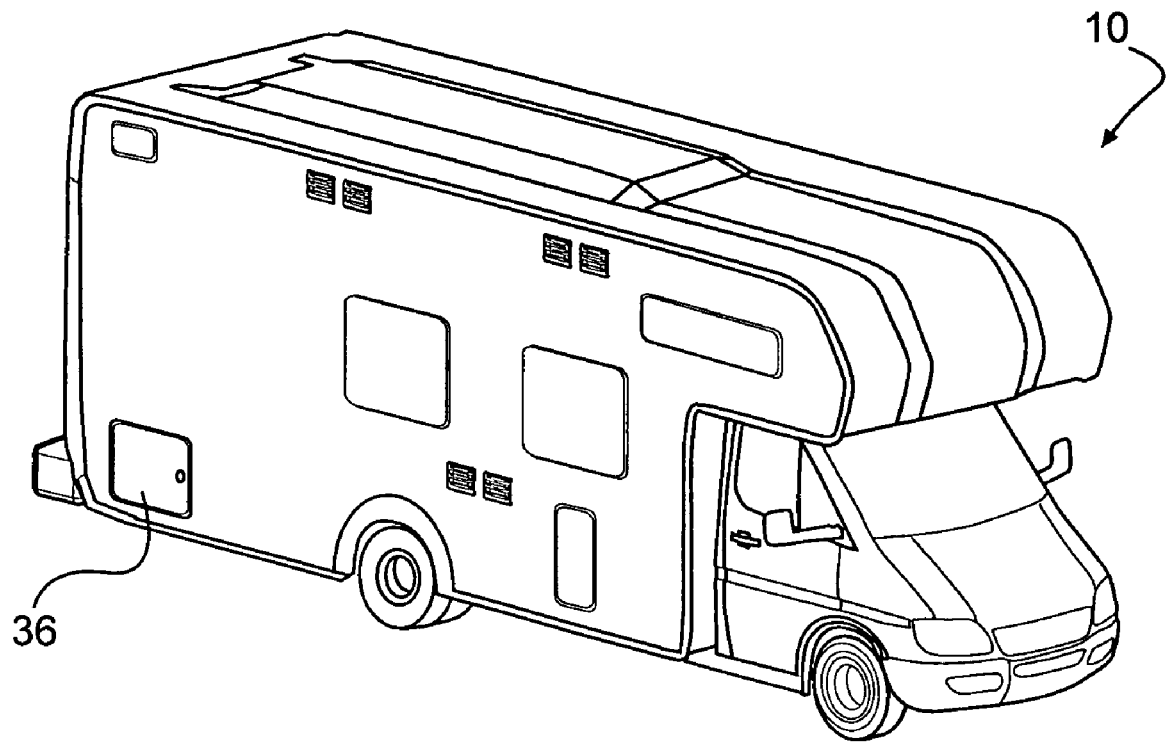
FIG. 3 is a side view of a recreational vehicle.
Figure 4:
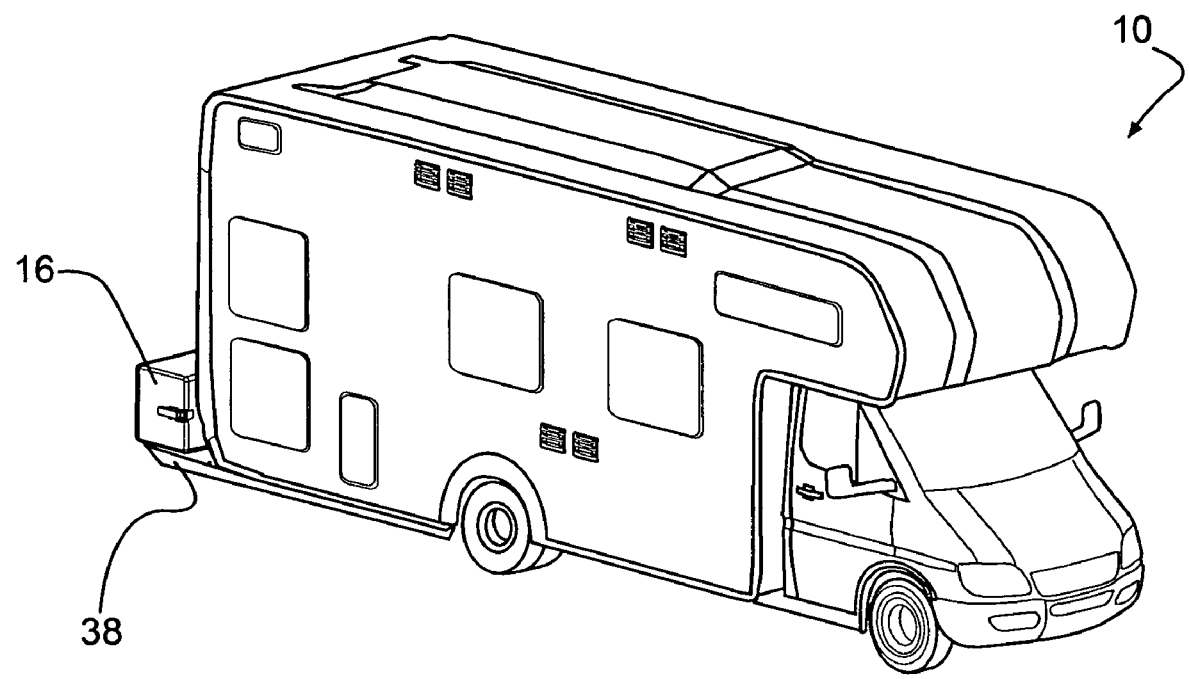
FIG. 4 is another side view of a recreational vehicle.

As illustrated in FIG. 1, the storage unit 16 is externally mounted on the rear bumper 24 of the RV 10. Other embodiments of storage unit 16 are also contemplated. For example, the storage unit 16 can be stored in a rear storage compartment 36 of an RV 10 (see FIG. 3) utilizing the interior mechanisms of the storage unit 16 discussed herein or the storage unit 16 can be mounted onto the RV 10 frame 38 (see FIG. 4).

Figure 5:
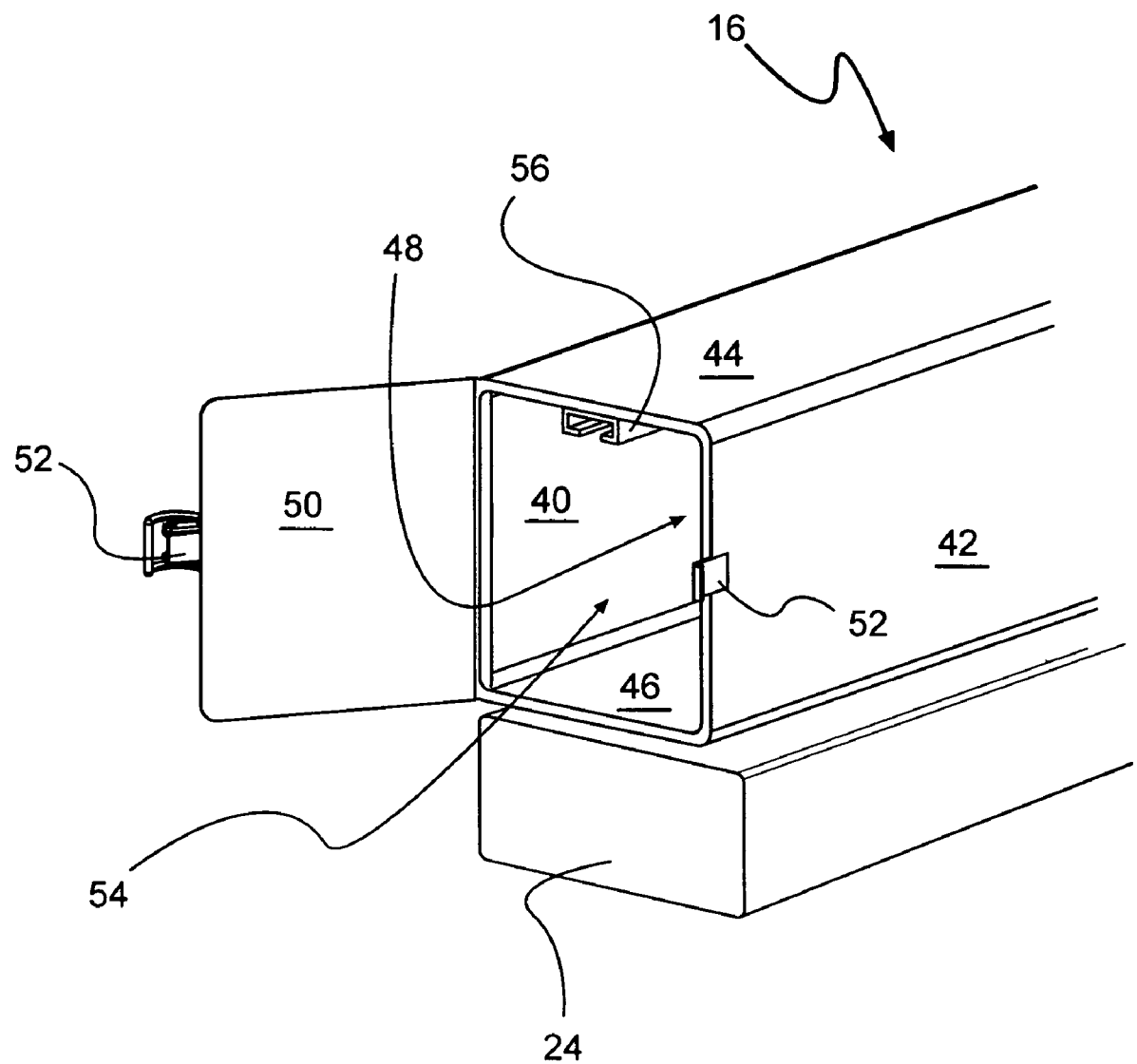
FIG. 5 is a side view of a storage unit.

The storage unit 16 is configured to completely contain the roller unit 22 and mat 12. In a preferred embodiment illustrated in FIG. 5, the storage unit 16 has two side walls 40, 42, a top 44, a bottom 46, an end 48 and a cap 50. Preferably, the bottom 46 is coupled to the bumper 24 with bolts, brackets, and the like. The cap 50 is removable (or hinged) so that the roller unit 22 can be inserted into the storage unit 16, as will be discussed further herein. A locking mechanism 52 can be utilized to secure the cap 50 to the storage unit 16. Preferred locking mechanisms include cotter pins, latches, pins, bolts, locks, and the like. The top 44 is also removable or hinged for ease in accessing the interior 54 of the storage unit 16 to repair or maintain the sliding mechanism 56, as will be discussed further herein. In an alternative embodiment, the side walls 40, 42 can also be removable or hinged for ease in accessing the interior 54 of the storage unit 16 to repair or maintain the sliding mechanism 56.

The storage unit 16 can be comprised of any durable material that can withstand wind, weather, and flying debris, such as aluminum, steel, plastic, wood, fiberglass, and the like. Preferably, the length of the storage unit 16 is less than the width of the RV 10. A preferred maximum dimension of the storage unit 16 is about six feet to about eight feet in length by about six inches to about 8 inches in width with a height of about six inches to about eight inches.

Figure 6:
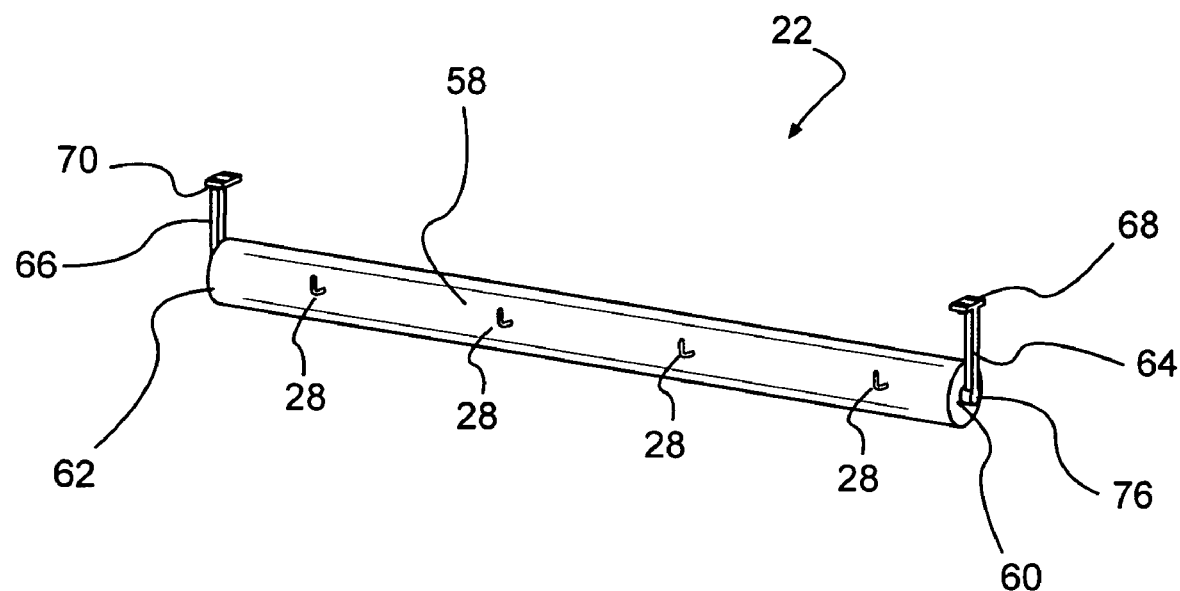
FIG. 6 is a side view of a roller unit.

Referring now to FIG. 6, the roller unit 22 is illustrated. The roller unit 22 comprises a bar 58 having a first end 60 opposite a second end 62. The bar 58 is pivotally coupled to a first bracket 64 at the first end 60 and to a second bracket 66 at the second end 62. A first caster 68 is coupled to the top of the first bracket 64 and a second caster 70 is coupled to the top of the second bracket 66. The first caster 68 and the second caster 70 are configured to slidingly couple to a sliding mechanism (or track) 56, 72 disposed in the interior 54 of the storage unit 16. The first caster 68 and the second caster 70 matingly couple with the track 72 to slide the roller unit 22 comprising the mat 12 in and out of the storage unit 16. A user of the RV mat device grasps the end of the roller unit 22 and pulls the roller unit 22 from the storage unit 16. It is contemplated that a handle (not shown) can be coupled to the first end 60 of the roller unit 22 for ease in pulling and pushing the roller unit 22 out of and into the storage unit 16. Other embodiments contemplate the use of a pulley system or a spring loaded mechanism for removing the roller unit 22 from the storage unit 16.

Preferably, the length of the roller unit 22 is less than the width of the RV 10. A preferred maximum dimension of the roller unit 22 is about six to about seven feet in length by about 1 inch to about 4 inches in diameter. The bar 58 can comprise any material that can support the weight of the rolled up mat 12. Preferred materials include aluminum, steel, plastic, wood, wire cable, and the like. A preferred maximum dimension of the bar 58 is about seven feet in length by about one inch in width.

Figure 7:
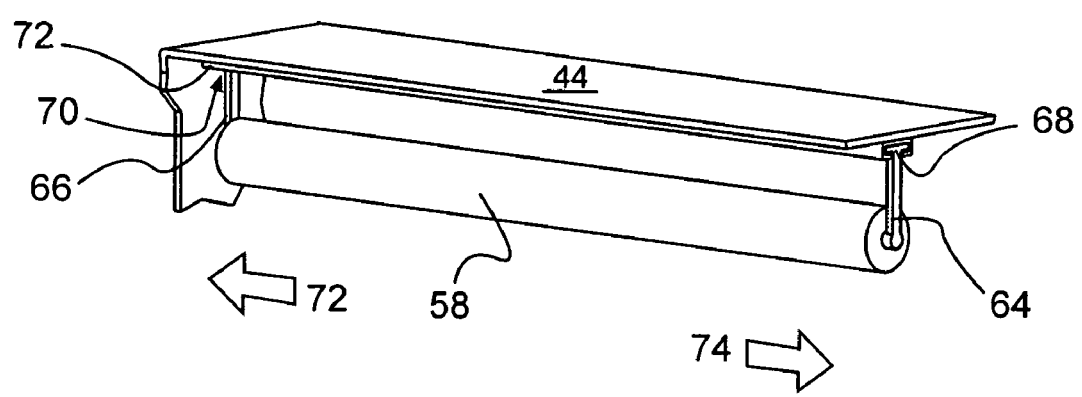
FIG. 7 is a another side view of a roller unit.

FIG. 7 illustrates a side view of the interior 54 of the storage unit 16. The track 72 is disposed on the top 44 of the storage unit 16. The first caster 68 and second caster 70 are configured to slide along the track 72 horizontally, as illustrated with arrows 72, 74, in order to have the roller unit 22 extend out from the storage unit 16. The second caster 70 is configured to support the weight of the extending roller unit 22 and to be retained by the track 72, when the roller unit 22 is fully extended from the storage unit 16. It is also contemplated that the first caster 68 and second caster 70 can be coupled to a sliding bracket unit (not shown) that also extends from the track 72 to protect the casters 68, 70.

The track 72 is located in the interior 54 of the storage unit 16. The track 72 is preferably coupled to the top 44, as illustrated in FIG. 7, in order to prevent dirt, sand, and debris from clogging or obstructing the operation of the track 72. In the alternative, the track 72 can be disposed in the interior 54 of the storage unit 16 on any of the interior walls of the side walls 40, 42, or bottom 46. The track 72 can be any conventional track that is configured to retain a caster 68, 70 (coupled to the roller unit 22) from exiting the track 72 while allowing at least one caster 68, 70 to slide along the track 72. Additionally, the track 72 can be configured to allow the caster 68, 70 to exit the track 72 at an end to allow the roller unit 22 to telescope from the storage unit 16.

The track is preferably a material sturdy enough to support the weight of the roller unit 22, including but not limited to, metals, such as steel, aluminum, metal composites, fiberglass, wood, and the like, as well as durable plastics. It is also contemplated that metal tracks can be fitted with ball bearings to allow for the roller unit 22 to easily glide and telescope out of the storage unit 16.

Figure 9:
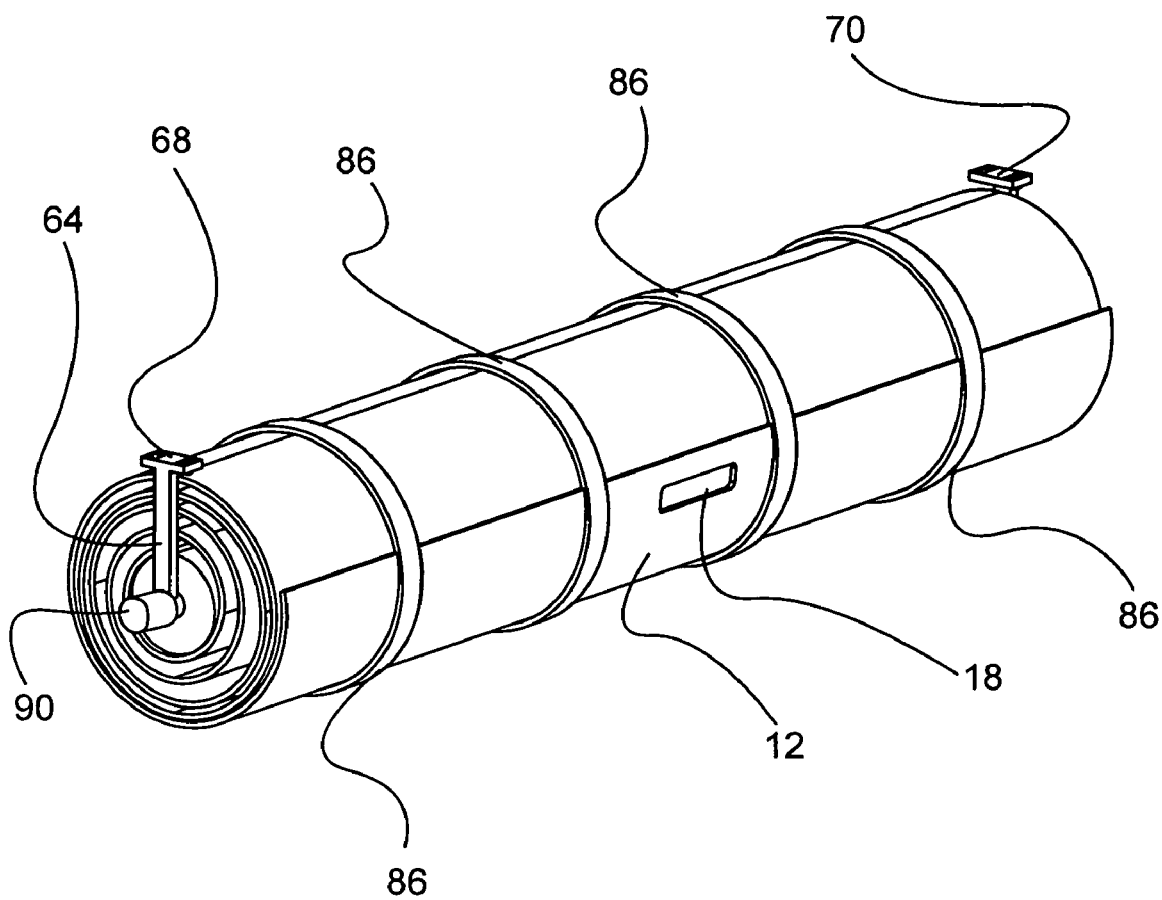
FIG. 9 is a side view of a mat disposed upon a roller unit.

Once extended from the storage unit 16, the supports 24 can be coupled to the first end 60 of the bar 58 to support the weight of the roller unit 22 on the ground 14. The first bracket 64 is configured with a connection mechanism 76 for coupling the supports 32 to the roller unit 22. Further, the crank handle 34 can be coupled to the first end 60 of the bar 58 for rotating the bar 58 in order to roll up the mat 12 onto the bar 58. In an alternative embodiment, a motor 90 can be coupled to the first end 60 of the bar 58 to automatically roll up the mat 12, as illustrated in FIG. 9. A preferred motor 90 can be an awning retracting motor.

The supports 32 can be any support that is configured to be stable on the ground 14 and to support the weight of the roller unit 22. It is contemplated that the supports 32 resemble conventional legs. The supports 32 comprise a sturdy and durable material that can support the weight of the roller unit 22. The crank handle 34 can be any conventional handle that is durable and easily attached to the connection mechanism 76.

Figure 8:
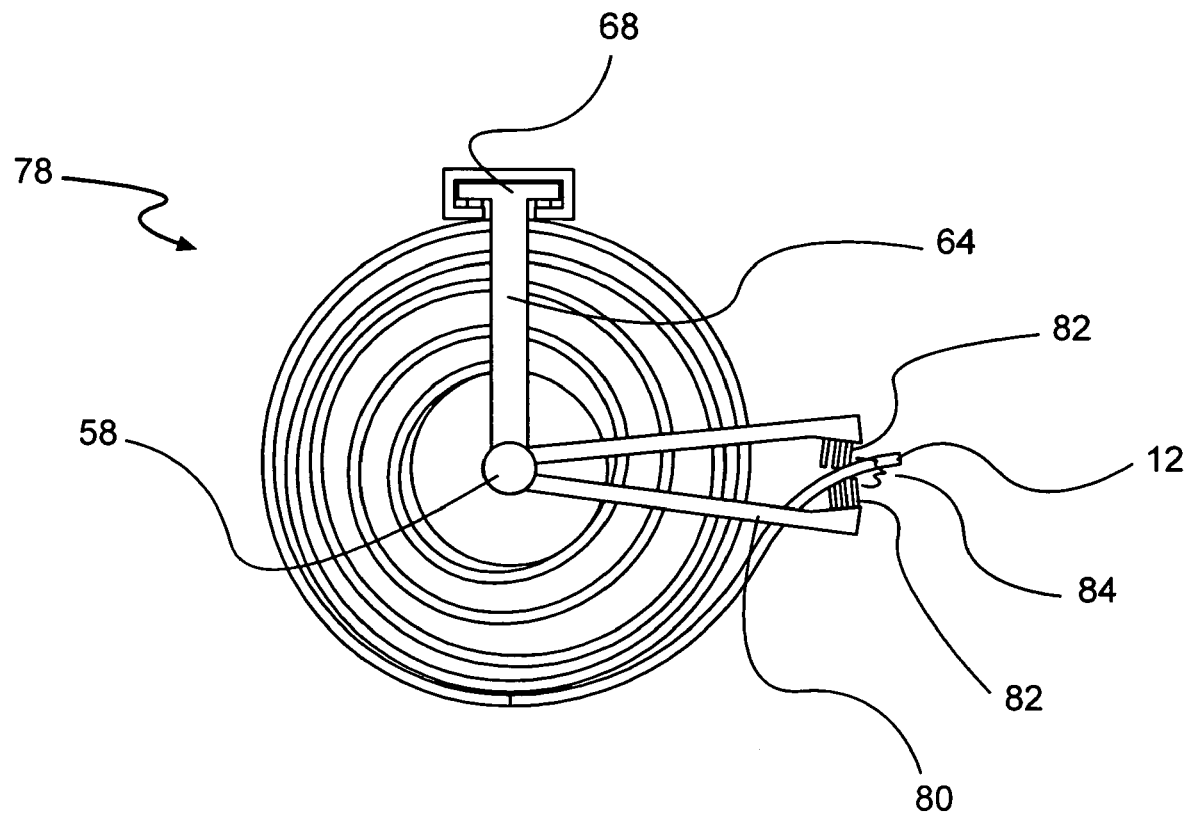
FIG. 8 is a side view of the roller unit comprising a brushing device.
Figure 8A:
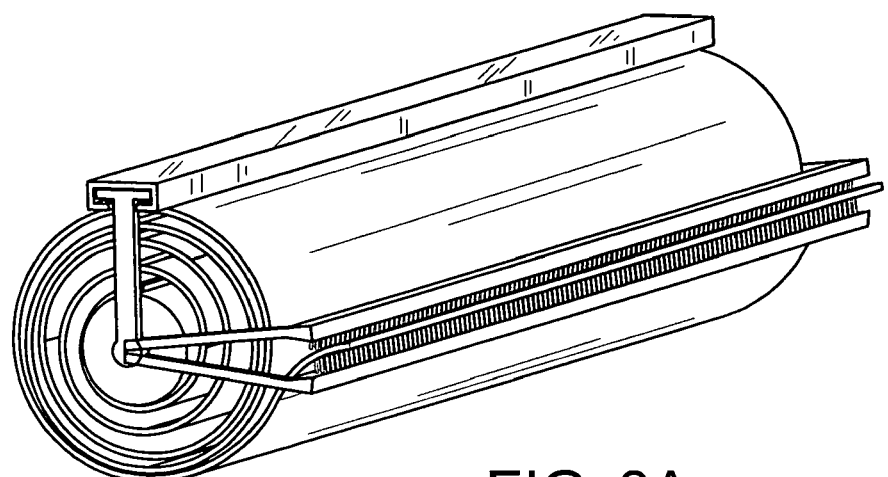
FIG. 8A is a front view of the roller unit comprising a brushing device.

Referring now to FIGS. 8 and 8A, a side view of the first end 60 of the roller unit 22 is illustrated. Coupled to each end 60, 62 and extending the length of the roller unit 22 is a brushing device 78. The brushing device 78 has spring loaded arms 80 coupled to the first bracket 64 and second bracket 66 of the roller unit 22 and extends outward from the roller unit 22. Coupled to the end of the arms 80 are brushes 82 utilized for cleaning the mat 12. The mat 12 is fed through the opening 84 between the brushes 82 and physically interacts with the brushes 82. The brushes 82 remove dirt and debris from the mat 12 as it is being rolled upon or removed from the roller unit 22. Although spring loaded arms 80 are described herein, any mechanism that can support the weight of the brushes interacting with the mat can be utilized.

When the mat 12 is rolled upon the roller unit 22, the mat can be secured onto the roller unit 22 with straps (or ties) 86. The straps 86 can be comprised of any material that is durable enough to retain the rolled mat 12. Preferred materials include vinyl, mesh, rubber, and the like. The straps 86 can be tied or hooked together with eye hooks, hook and loop fasteners, snaps, or other conventional hooking mechanisms.

The weighted bar 20 is coupled to the end of mat 12 and provides a mechanism for attaching the mat 12 to the roller unit 22. The weighted bar 20 also serves to weight down the mat 12 for holding the mat 12 in place on the ground 14. The weighted bar 20 is preferably a material that is durable, including but not limited to, a heavy rubber material, a light weight metal material, plastic, and the like. The weighted bar 20 can be a single item extending the length of the mat as illustrated in FIG. 1 or the weighted bar 20 can be several separate pieces coupled to the mat 12. It is contemplated that the weighted bar 20 can be attached to the mat 12 or can be easily installed on to any mat 12 desired by the user.

Figure 10:
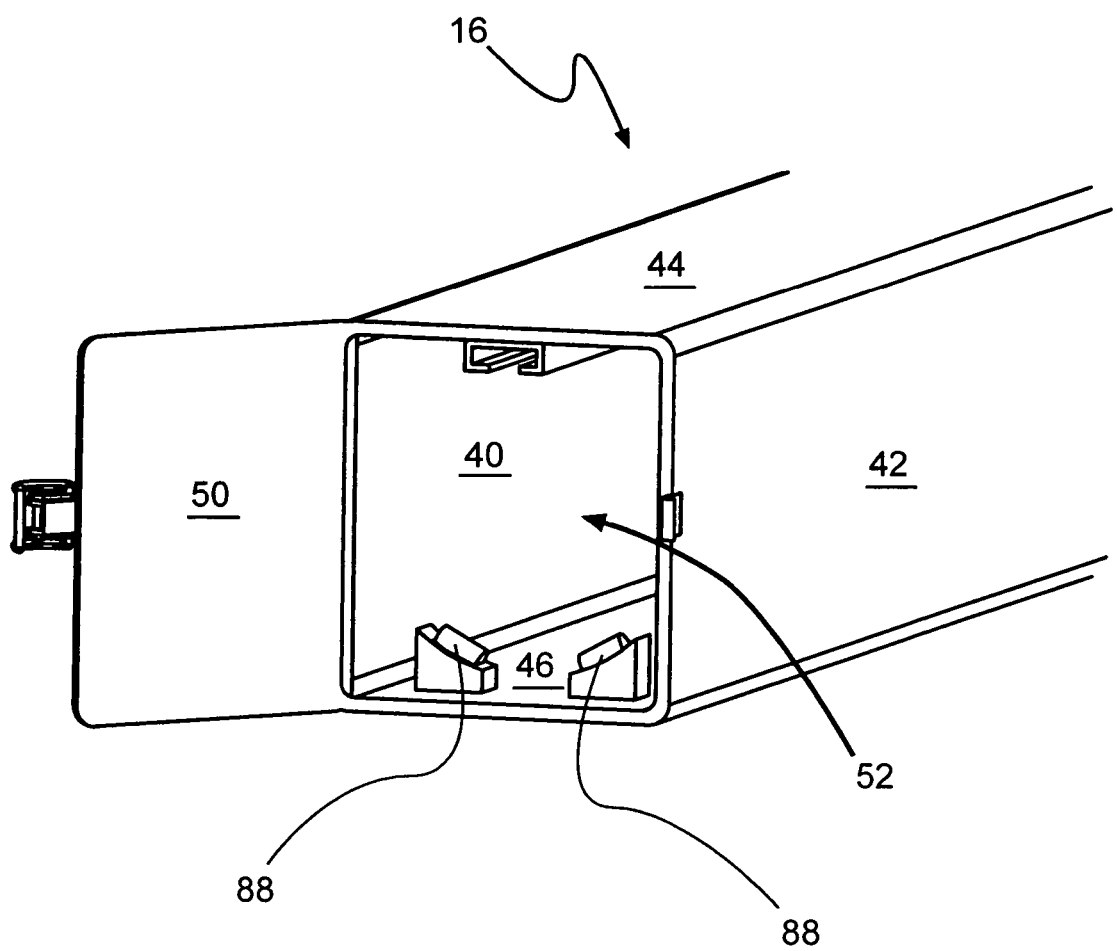
FIG. 10 is a side view of a storage unit.
Figure 11:
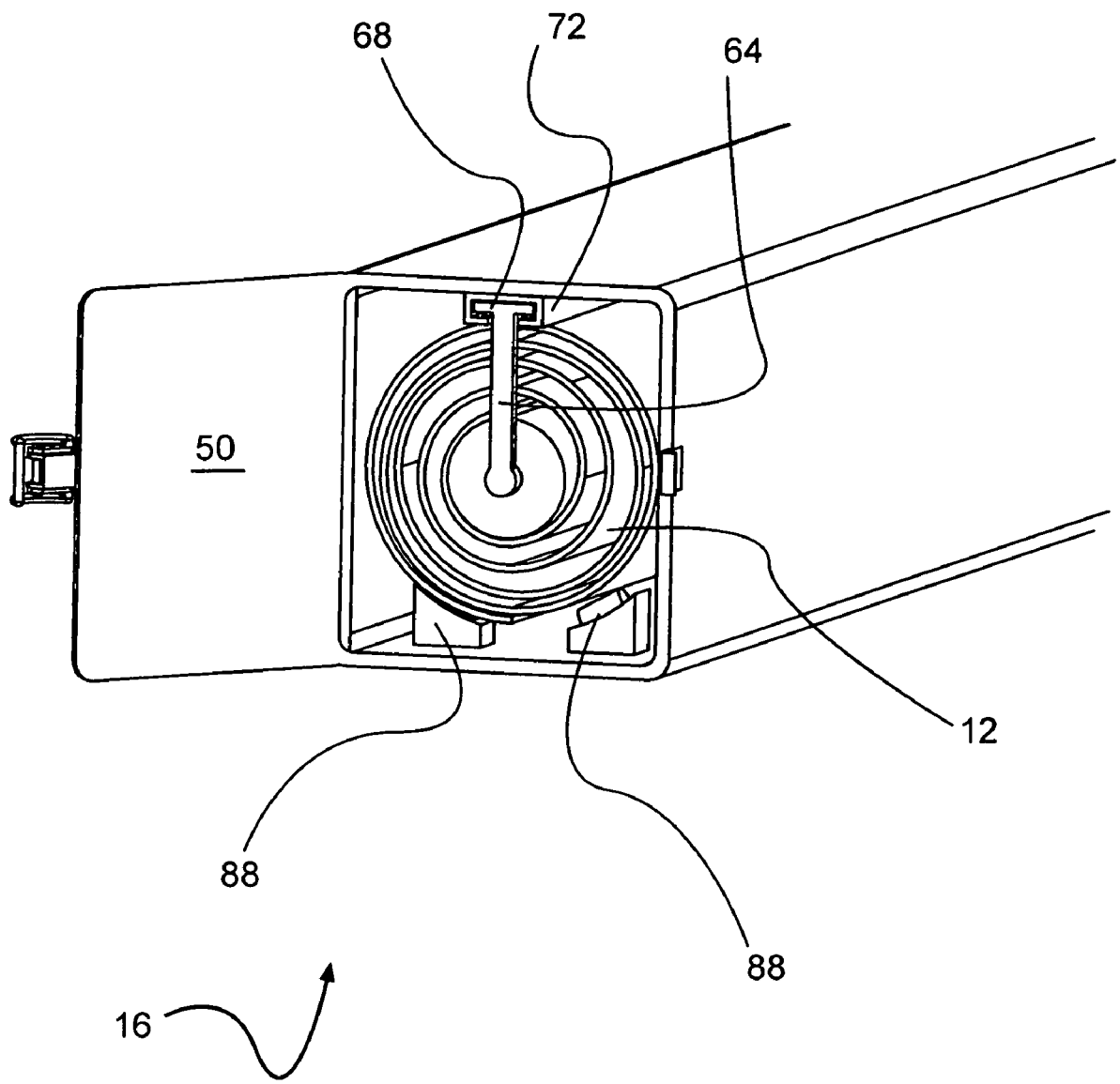
FIG. 11 is another side view of a storage unit.

Referring now to FIGS. 10 and 11, for ease in moving the roller unit 22 from the storage unit 16, casters (or rollers) 88 can be installed in the interior 54 of the storage unit 16. It is contemplated to have two or more casters 88 to cradle the end 62 of the roller unit 22 in order to give the roller unit 22 support while moving in and out of the storage unit 16. The casters 88 can also act to stabilize the roller unit 22 when completely stored away and when the RV 10 is being operated. It is also contemplated to have several casters 88 disposed in the interior 56 of the storage unit 16 to support the roller unit 22.

When the RV 10 is positioned at a campsite, the user can easily retrieve the mat 12 from the storage unit 16. The user removes the cap 50 from the storage unit 16. The user grasps the end 60 of the roller unit 22, preferably a handle (not illustrated). The user pulls the roller unit 22 from the storage unit 16, such that the mat 12 rolled upon the roller unit 22 extends perpendicularly from the RV 10. Casters 88 coupled to the storage unit 16 guide and support the mat 12. When fully extended, the supports 32 are coupled to the end 60 of the roller unit 22 to support the weight of the mat 12. The user removes the straps 86 from the mat 12 and grasps the handle 18. The user completely unrolls the mat 12 from the roller unit 22 and places the handle 18 end on the ground 14. The user then removes the weighted bar 20 from the roller unit 22 and places it on the ground 14. When the mat 12 is completely on the ground 14, the user can then remove the supports 32 and slide the roller unit 22 back into the storage unit 16 for storage.

When the user is finished with the mat 12, the user simply extends the roller unit 22 from the storage unit 16 and places the supports 32 on the end 60. The weighted bar 20 of the mat 12 is coupled to the roller unit 22 via the hooking mechanisms 26. A crank handle 32 can be utilized to roll the mat 12 onto the roller unit 22. As indicated above, in the alternative, a motor 90 can be utilized to automatically retract the mat 12 onto the roller unit 22. As the mat 12 is rolled, a brushing device 78 coupled along the length of the roller unit 22, brushes debris off both sides of the mat 12. Once the mat 12 is completely retracted upon the roller unit 22, the user secures the mat 12 with the straps 86. Next, the user removes and separately stores the supports 32. The user can then push the roller unit 22, such that the roller unit 22 rolls along the casters 88 into the storage unit 16. The user then replaces the cap 50 and drives away.

The present disclosure is a portable mat for a recreational vehicle (RV) for extending living space. The mat is conveniently stored in a storage unit located on the RV and easily removed via a roller unit that extends from the storage unit. Once extended and supported, the mat can be unrolled from the roller and released to the ground. The user can easily reattach the mat to the roller unit and roll the mat over the roller unit. The present disclosure provides a device that allows an RV mat to be easily accessible, readily unrolled and re-rolled, and easily maintained by the RV user.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings without departing from the essential scope thereof. Therefore, it is intended that the disclosure not be limited to the particular embodiment disclosed as the best mode contemplated for carrying out this disclosure.

What is claimed is:

1. A mat device for a recreational vehicle comprising:
    a mat configured to be utilized on a ground surface near the recreational vehicle;
    a roller unit having a rotatable bar disposed between a first end opposite a second end, said rotatable bar coupled to a first caster device at said first end and to a second caster device at said second end, said mat configured to couple to and to roll upon said rotatable bar; and
    a storage unit having a top wall opposite a bottom wall, a first side wall opposite a second side wall, and a cap opposite a back wall with a track coupled to an interior of said storage device, said track configured to receive said first caster device and said second caster device of said roller unit, wherein said storage unit is located on the recreational vehicle.

2. The mat device of claim 1, further comprising:
a weighted bar coupled to a first end of said mat, said weighted bar having receiving mechanisms for coupling said mat to said rotatable bar of said roller unit; and
a handle coupled to a second end of said mat.

3. The mat device of claim 1, wherein said first caster device and said second caster device are configured to matingly couple to said track.

4. The mat device of claim 1, wherein said roller unit is configured to move along said track and extend outwardly from said storage unit.

5. The mat device of claim 1, wherein said first caster device comprises a first caster and a first bracket coupled to said first end of said roller unit; and
wherein said second caster device comprises a second caster and a second bracket coupled to said second end of said roller unit.

6. The mat device of claim 1, wherein said rotatable bar has hooking mechanisms configured to couple to said mat.

7. The mat device of claim 1, further comprising:
a support coupled to a first end of said roller unit and to stand on said ground surface, said support configured to support the weight of said roller unit.

8. The mat device of claim 1, further comprising:
a crank handle coupled to a first end of said roller unit, said crank handle configured to rotate for rolling said mat upon said roller unit.

9. The mat device of claim 1, further comprising:
a motor configured to couple to a first end of said roller unit, said motor configured to operate by automatically rolling said mat upon said roller unit.

10. The mat device of claim 1, further comprising:
straps coupled around said mat when rolled upon said roller unit, said straps configured to hook to itself for holding said mat onto said roller unit.

11. The mat device of claim 1, further comprising:
at least two interior casters disposed in said interior of said storage unit, said at least two interior casters configured to rotate when said roller unit is disposed into said storage unit and to support weight of said roller unit in said storage unit.

12. The mat device of claim 1, further comprising:
at least one brushing device coupled between said first end and said second end of said roller unit, said at least one brushing device configured to physically interact with said mat when said mat is being rolled upon said roller unit.

13. The mat device of claim 1, wherein said track is coupled to said interior of said top of said storage unit.

14. The mat device of claim 1, wherein said storage unit is coupled to at least one of a bumper of the recreational device and a frame of the recreational device.

15. The mat device of claim 1, wherein said storage unit is disposed in an interior compartment of the recreational device.

16. A method of using a mat device for a recreational vehicle comprising:
opening a cap of a storage unit, said storage unit comprising a top wall opposite a bottom wall, a first side wall opposite a second side wall, and said cap opposite a back wall with a track coupled to an interior of said storage device, said track configured to receive said roller unit, wherein said storage unit is located on the recreational vehicle;
pulling a roller unit from storage unit, said roller unit having a rotatable bar disposed between a first end opposite a second end, said rotatable bar coupled to a first caster device at said first end and to a second caster device at said second end, and a mat coupled to and rolled upon said rotatable bar, wherein said roller unit moves along said track and fully extends from said storage unit;
coupling at least one support to said first end of said roller unit, said support stands on a ground surface;
removing at least one strap coupled to itself from said mat rolled upon said roller unit;
grasping a handle coupled to a first end of said mat;
pulling said handle to unravel said mat from said roller unit;
uncoupling receiving mechanisms of said weighted bar disposed on a first end of said mat from hooking mechanisms disposed on said rotatable bar; and
positioning said mat on said ground surface.

17. A method of using a mat device for a recreational vehicle comprising:
extending a roller unit from a storage unit disposed on a recreational vehicle, said roller unit having a rotatable bar disposed between a first end opposite a second end, said rotatable bar coupled to a first caster device at said first end and to a second caster device at said second end, and a mat coupled to and rolled upon said rotatable bar, wherein said roller unit moves along a track disposed in an interior of said storage unit;
coupling at least one support to said first end of said roller unit, said support stands on a ground surface;
coupling receivers disposed on a weighted bar coupled to a second end of said mat to hooking mechanisms disposed on said rotatable bar;
rotating said rotatable bar of said roller unit;
rolling said mat upon said rotatable bar of said roller unit;
coupling at least one strap around said mat rolled upon said roller unit, said at least one strap coupled to itself;
removing said support from said roller unit; and
pushing said roller unit into said storage unit, said roller unit sliding along said track and into said storage unit.

18. The method of claim 17, wherein said rotating said rotatable bar of said roller unit is completed using at least one of a crank handle and a motor.

19. The method of claim 17, wherein said storage unit comprising a top wall opposite a bottom wall, a first side wall opposite a second side wall, and a cap opposite a back wall with said track coupled to an interior of said storage device, said track configured to receive said roller unit, wherein said storage unit is located on the recreational vehicle.

20. The method of claim 17, further comprising:
disposing said mat through at least one brushing device coupled between said first end and said second end of said roller unit, said at least one brushing device configured to physically interact with said mat when said mat is being rolled upon said roller unit.

* * * * *